(12) United States Patent
André

(10) Patent No.: US 11,815,224 B1
(45) Date of Patent: *Nov. 14, 2023

(54) QUICK CONNECT ELECTRONIC DEVICE MOUNT WITH KNOB RELEASE

(71) Applicant: Brodit AB, Karlsborg (SE)

(72) Inventor: Stig Göran Anders André, Karlsborg (SE)

(73) Assignee: Brodit AB, Karlsborg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,144

(22) Filed: May 30, 2023

Related U.S. Application Data

(63) Continuation-in-part of application No. 18/112,250, filed on Feb. 21, 2023.

(51) Int. Cl.
  *G06F 1/16* (2006.01)
  *F16M 13/02* (2006.01)

(52) U.S. Cl.
  CPC ........... *F16M 13/02* (2013.01); *G06F 1/1607* (2013.01)

(58) Field of Classification Search
  CPC .... F16M 13/02; F16M 11/041; H04B 1/3888; H04M 1/04; A45F 2200/0525; A45F 2200/0516; B60R 11/0252; B60R 11/0241; G06F 1/1607
  See application file for complete search history.

(56) References Cited

U.S. PATENT DOCUMENTS

| | | | |
|---|---|---|---|
| 6,229,893 B1* | 5/2001 | Chen | B60R 11/0241 379/454 |
| 7,013,164 B2* | 3/2006 | Lin | H04B 1/207 455/42 |
| 8,177,178 B2 | 5/2012 | Carnevali | |
| 8,929,065 B2* | 1/2015 | Williams | G06F 1/1632 361/679.41 |
| 9,647,474 B2* | 5/2017 | Fathollahi | G06F 1/1626 |
| 9,660,682 B2 | 5/2017 | Smith et al. | |
| 9,698,851 B2 | 7/2017 | Andrus | |
| 9,898,041 B2* | 2/2018 | Blowers | E05B 73/0082 |
| 10,608,384 B2* | 3/2020 | Warren | H01R 31/065 |
| 10,767,810 B2 | 9/2020 | Yamamori et al. | |
| 10,810,570 B1* | 10/2020 | Martin | G06F 1/1607 |
| 11,029,731 B1* | 6/2021 | Carnevali | H04B 1/3888 |
| 2005/0090301 A1* | 4/2005 | Lange | B60R 11/0241 455/100 |

(Continued)

*Primary Examiner* — Bradley Duckworth
(74) *Attorney, Agent, or Firm* — Stiennon & Stiennon

(57) ABSTRACT

A frame assembly retains an electronic device such as a tablet computer between a frame and a back plate to expose the device's female connector. The back plate is positionable to overlie a base plate of a base assembly. A male plug is mounted on a pedestal to extend parallel to the base plate. The back plate and the base plate have a mating sliding connection with a mounting block with portions projecting into an opposed mounting slot. The connection guides the frame assembly to accurately engage the device female connector with the base assembly male plug. A knob is rotatable to releasably latch the frame assembly in its connected position with the base assembly and gives a sensible indication of the completed latching action. By rotating the knob the frame assembly is unlatched and urged away from the pedestal releasing the male plug from the electronic device female connector.

18 Claims, 9 Drawing Sheets

(56) References Cited

U.S. PATENT DOCUMENTS

2009/0152418 A1    6/2009  Bury
2017/0227987 A1*  8/2017  Carnevali ............. G06F 1/1632
2023/0121126 A1*  4/2023  Andler ................ H04B 1/3877
                                                                235/383

* cited by examiner

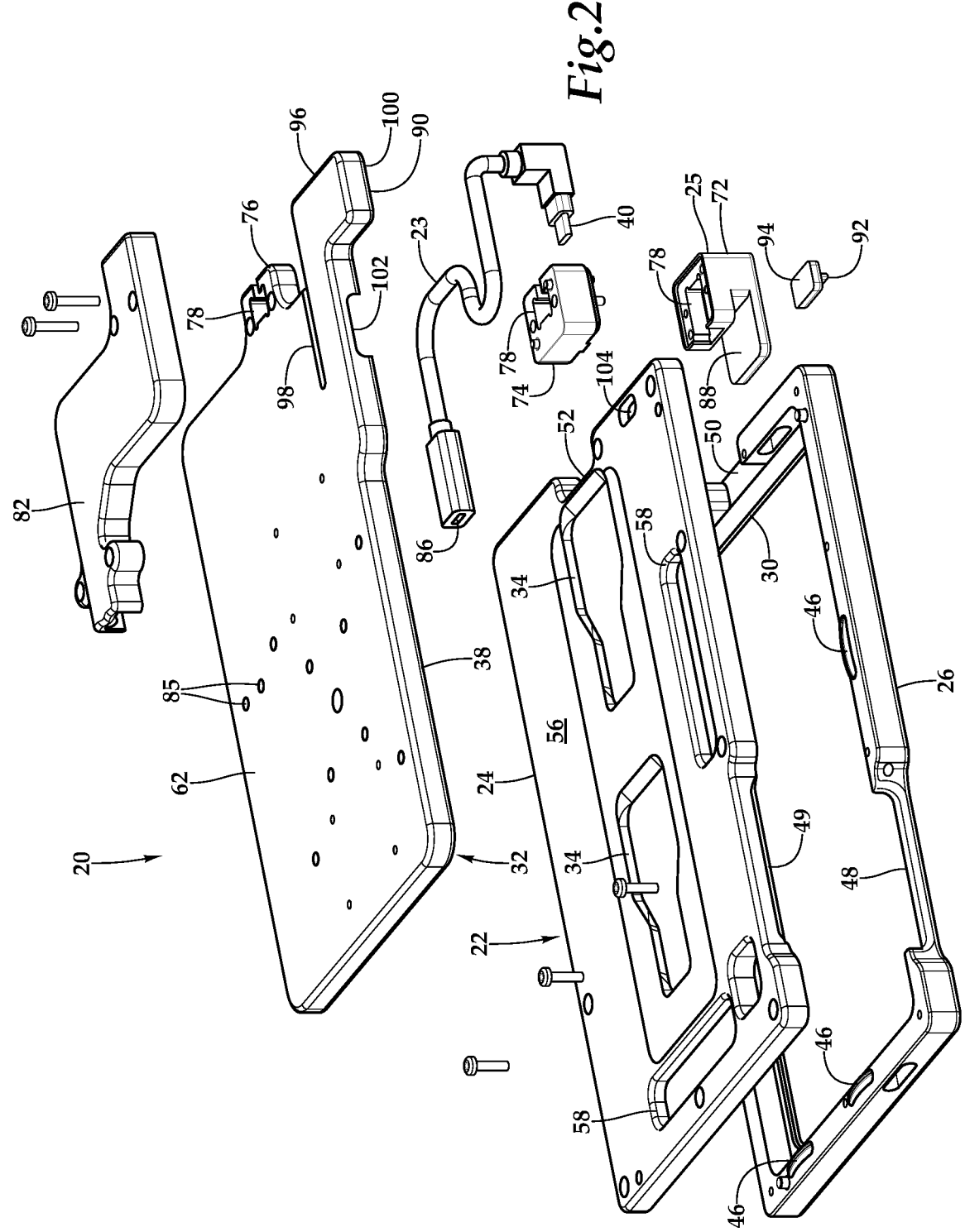

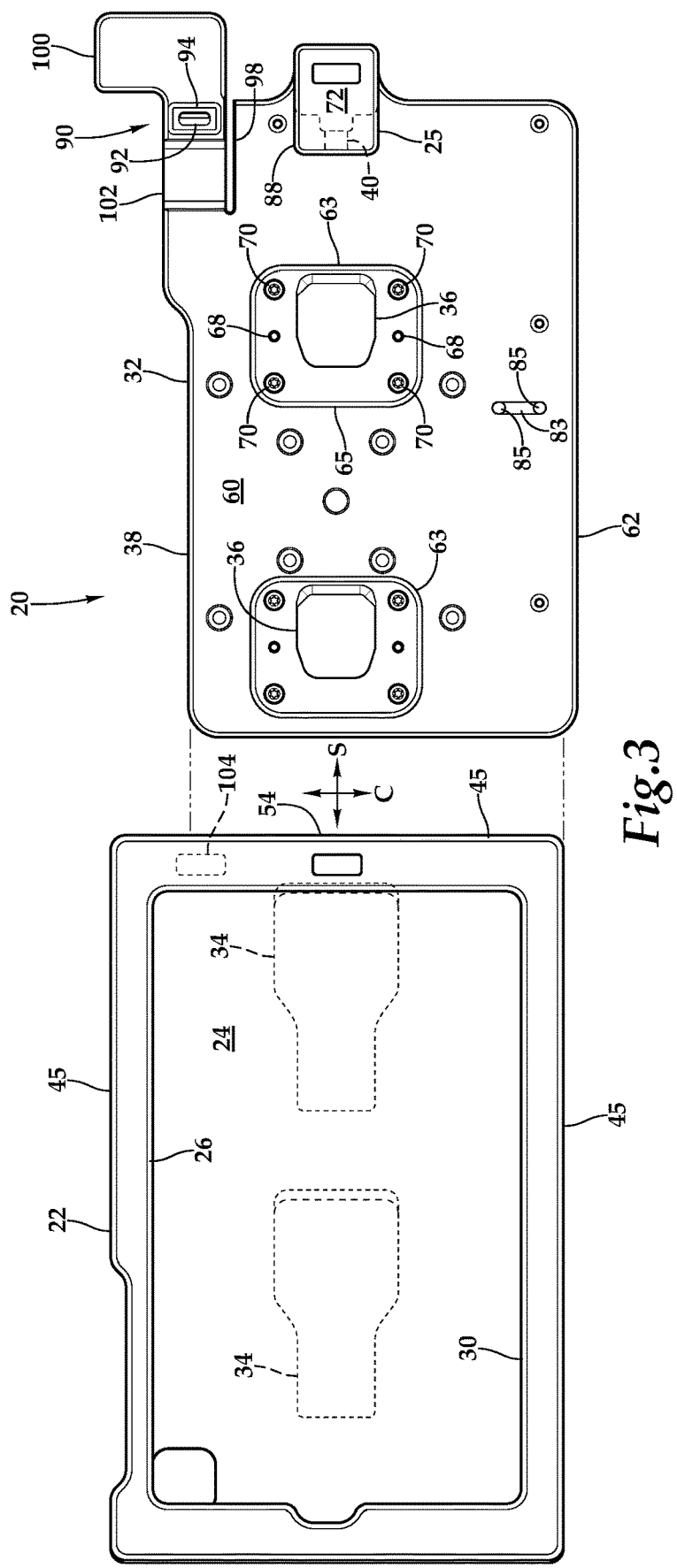

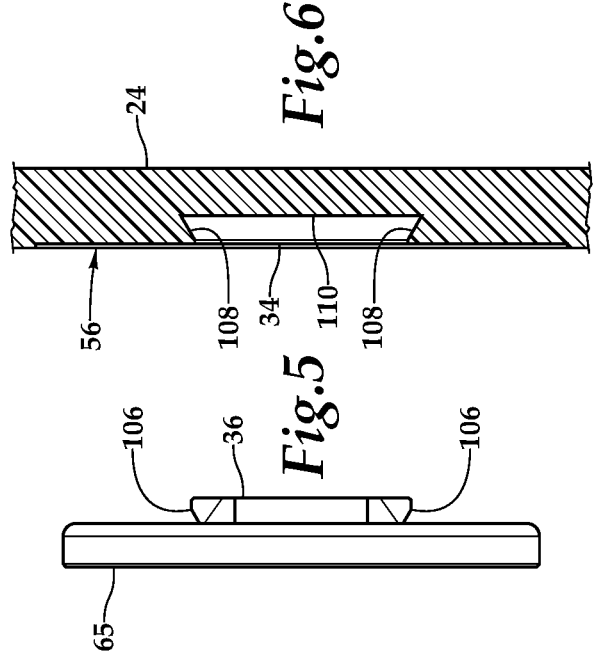
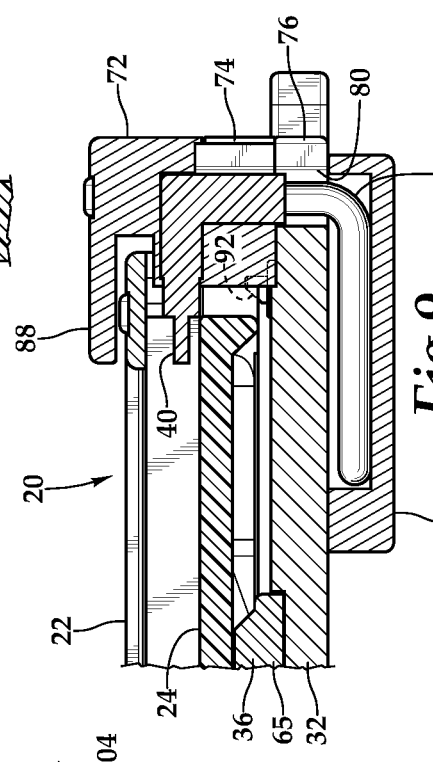
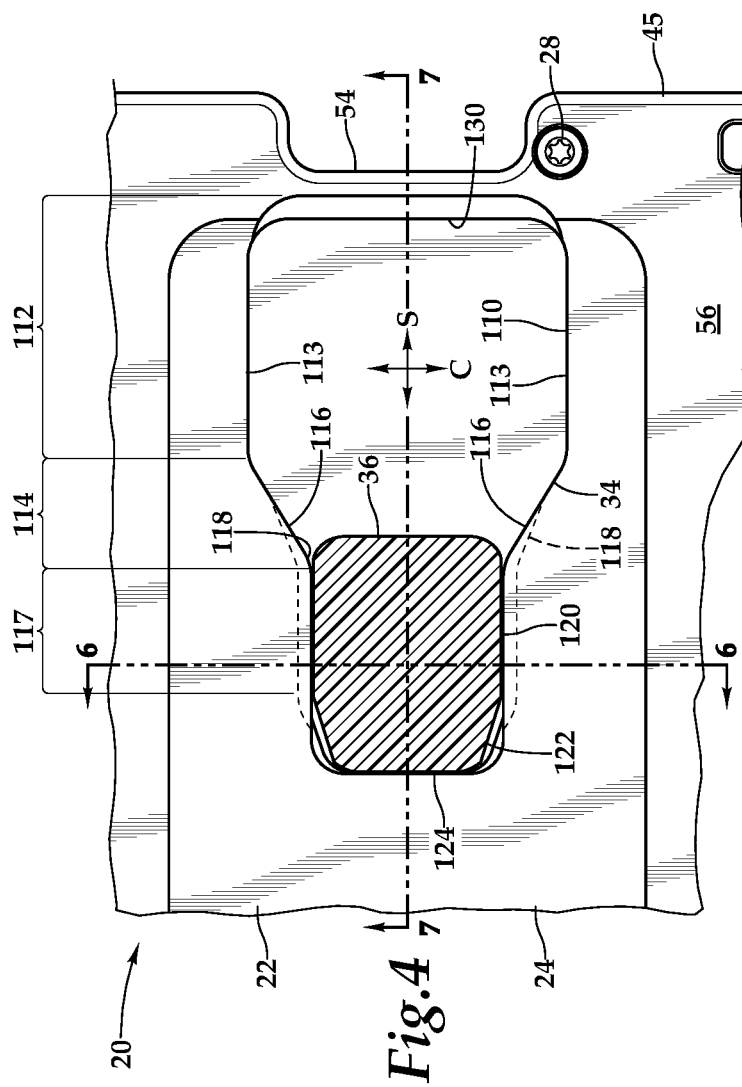
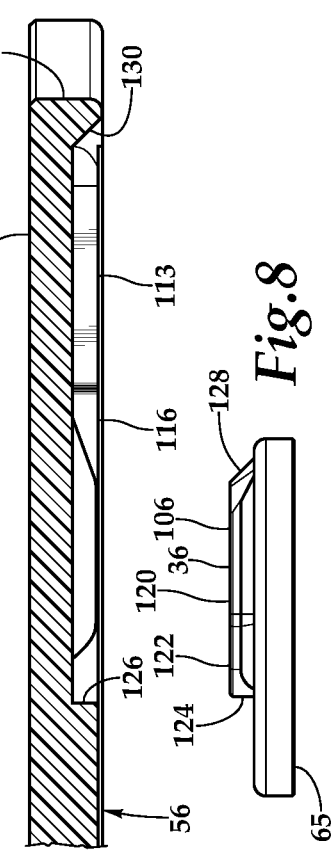

QUICK CONNECT ELECTRONIC DEVICE MOUNT WITH KNOB RELEASE

CROSS REFERENCES TO RELATED APPLICATIONS

This application is a continuation-in-part application of U.S. application Ser. No. 18/112,250, filed Feb. 21, 2023, the disclosure of which is incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to devices for detachably mounting electronic devices in general, and more particularly to devices for rapidly mounting electronic devices without tools.

Tablet computers and mobile electronic devices are used in transportation, manufacturing, warehousing, healthcare, law enforcement and emergency medical services and wherever the electronic capabilities of computers, tablets, cellphones, barcode scanners, GPS units, or other specialized apparatus are needed. Protective cases and frames not only provide a solid structure for mounting the electronic device within a vehicle, cart or workstation, but they also can shield often delicate devices from impact and abrasion.

The encased electronic device can be mounted to its place of use with screw fasteners or other arrangements requiring tools, but often the electronic device must be frequently removed from its mount, for example to accompany a vehicle driver making a delivery to a customer, to go with an emergency medical technician helping a patient, or to assist a material handler moving goods within a warehouse. In these mobile environments it is important that the encased electronic device can be rapidly and precisely inserted and removed from its mount. In addition, although many electronic devices are powered by internal batteries, it may be necessary to continuously supply power to the device and establish a data connection with a wireless network. In these cases successful operation means that the power and data connection must be securely and accurately made, sometimes many times a day. Arrangements which first engage the plug and then engage the case can require intricate mechanisms which are subject to wear.

Not only are there a vast number of types and sizes of electronic device, but even devices of a particular type are regularly modified or upgraded, often resulting in a different form factor. What is needed is an arrangement for repeatably and securely mounting and demounting electronic devices that can readily accept frame devices of a wide variety of sizes.

SUMMARY OF THE INVENTION

The mounting assembly of this invention has a protective frame assembly which receives an electronic device for rapid and secure connection to a base assembly fixed to a vehicle or workstation. The frame assembly has two rearwardly facing mounting slots which are slidably engageable with mating mounting blocks which project frontwardly from a planar base plate of the base assembly. The frame assembly is guided by the mounting blocks to bring a female port of the electronic device into alignment and connection with a male plug mounted on a pedestal extending from the base assembly. Because the mounting blocks are the only structure protruding frontwardly from the base assembly base plate, the base assembly is unobstructed to the sides. As a result, the frame assembly need not match the dimensions of the base assembly and a wide variety of framed devices may be attached to a common base assembly. A rotatable latch arrangement provides a sensible indication of secure attachment of the frame assembly to the base plate, and is rotatable to unlatch the frame assembly and urge the male plug out of engagement with the female port of the electronic device.

It is an object of the present invention to provide a frame for an electronic device which is quickly and precisely mounted to a base providing power and data connections.

It is a further object of the present invention to provide a mounting base that can receive framed electronic devices of a wide range of dimensions.

It is yet another object of the present invention to provide a secure mounting arrangement between a framed electronic device and a base power and data connection.

It is a still further object of the present invention to provide an arrangement which allows a connection between a framed electronic device and a base which can be secured and released without the use of tools.

It is also an object of the present invention to provide a latch arrangement which gives a sensible indication of a secure connection, and which can be operated to initiate the disengagement of a frame assembly from a base assembly.

Further objects, features and advantages of the invention will be apparent from the following detailed description when taken in conjunction with the accompanying drawings.

BRIEF DESCRIPTION OF THE DRAWINGS

FIG. 2 is a rear exploded isometric view of the assembly of FIG. 1.

FIG. 3 is a front plan view of the frame assembly of FIG. 1 shown exploded away from the base assembly, with the grooves on the underside of the frame assembly base plate shown in hidden lines.

FIG. 4 is a fragmentary bottom elevational view of the frame assembly of FIG. 3, with a portion of a base mounting block received within a mounting slot.

FIG. 5 is an end view of the mounting block of FIG. 4.

FIG. 6 is a fragmentary cross-sectional view of the frame assembly of FIG. 4 taken along section line 6-6.

FIG. 7 is a fragmentary cross-sectional view of the frame assembly of FIG. 4 taken along section line 7-7.

FIG. 8 is a side elevational view of the mounting block of FIG. 4.

FIG. 9 is a fragmentary cross-sectional view of the frame assembly mounted to the base assembly of FIG. 4, taken along section line 7-7.

DESCRIPTION OF THE PREFERRED EMBODIMENTS

Figure 1:
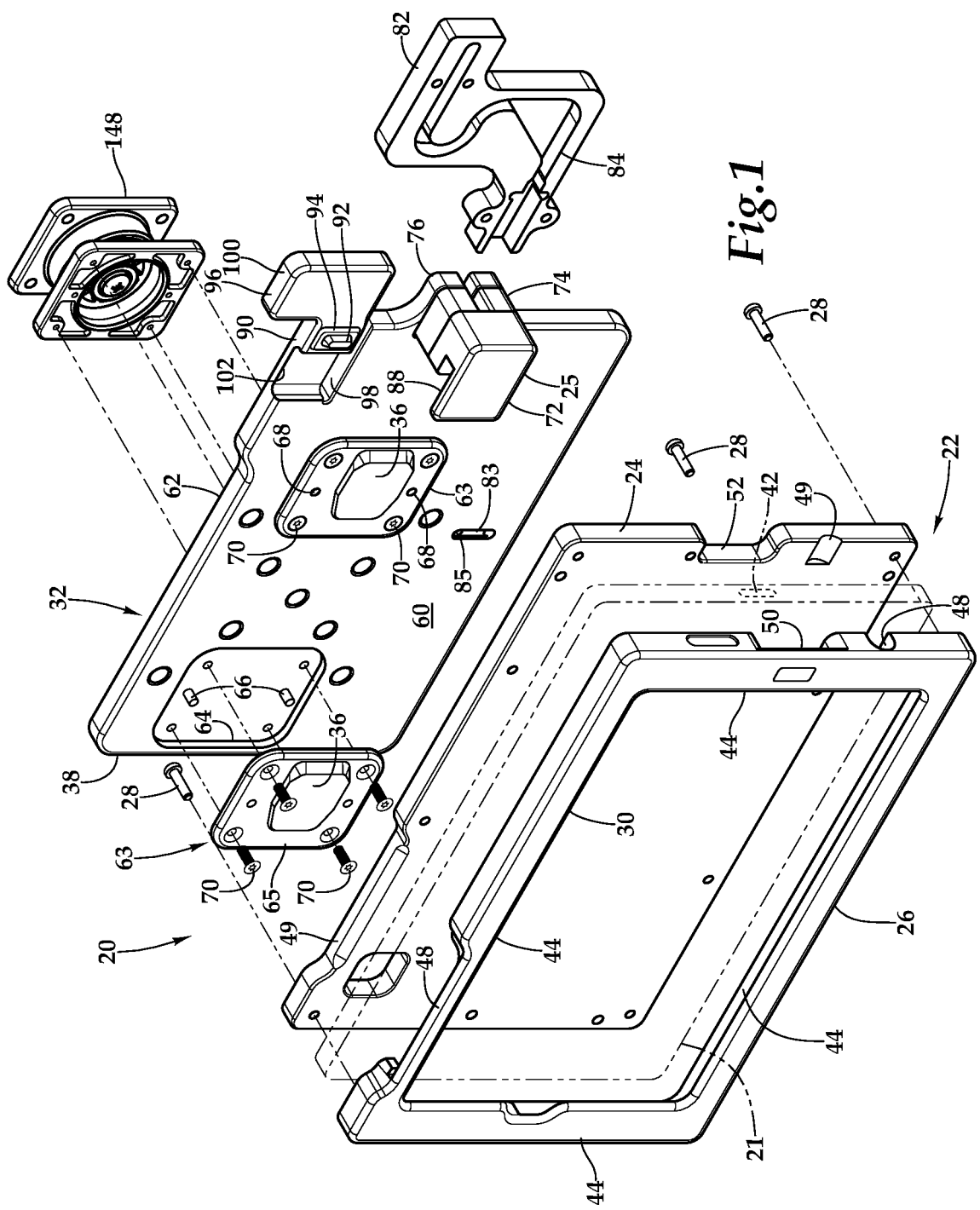
FIG. 1 is a front exploded isometric view of the quick disconnect electronic device mount of this invention.

Referring more particularly to FIGS. 1-26, wherein like numbers refer to similar parts, a mounting assembly 20 for an electronic device 21 such as a tablet computer is shown in FIG. 1. The mounting assembly 20 has a frame assembly 22 which securely engages and protects the electronic device 21. The frame assembly 22 has a back plate 24 and a frame 26 which connects to the back plate by screw fasteners 28, allowing the removable fastening of the electronic device 21 between the frame and the back plate such that a control or display surface of the device is accessible through a window opening 30 in the frame. A base assembly 32 of the mounting assembly 20 receives the frame assembly 22 for secure and definite positioning of the electronic device with respect to a power/data connection provided by a cable 23 protruding from a pedestal 25. As shown in FIG. 2, the frame assembly 22 has mounting slots 34 which slidably receive mounting blocks 36 which project from a base plate 38 of the base assembly 32 such that sliding movement of the frame assembly in a sliding direction S towards the pedestal engages the frame assembly with the base assembly in alignment with the male plug of the cable 23 at the pedestal to thereby mate the female connector 42 of the electronic device 21 with the male plug of the base assembly.

As shown in FIG. 1, the frame 26 may be a machined part, formed for example of ABS plastic, having side members 44 which extend alongside the four sides of the electronic device 21, and may be provided with integral springs 46 machined into the side members which engage the electronic device. The side members 44 of the frame are provided with clearance openings 48 to allow the continued operation of features of the device, for example, an on/off switch, a headphone jack, volume adjustment and vent openings. The back plate 24 is provided with reliefs 49 to provide clearance for features of the electronic device which are close to the device bottom, for example headphone jacks or volume buttons. The dimensions of the frame 26 and back plate 24 and location of the clearance openings or reliefs 48, 49 are configured to suit the particular electronic device which it is designed to protect.

One of the frame side members 44 which will extend along the female charging/data port 42 of the electronic device 21 is provided with a relief opening 50 which overlies a notch 52 in the back plate. The relief opening 50 and notch 52 define a sidewardly opening access region 54, indicated in FIG. 3, which exposes the female port 42 of the electronic device, shown in FIG. 1, for access and allows a close approach and mating of the male plug 40, shown in FIG. 2 of the base assembly with the female port.

As shown in FIG. 2, the back plate 24 of the frame assembly 22 has a rear surface 56 which faces the base assembly 32 and is positioned to overlie the base plate 38 when the frame assembly is received on the base assembly. The two mounting slots 34 are formed on the back plate 24 to open on the rear surface, and may be machined into the back plate. The mounting slots 34 are aligned with one another and directed towards the notch 52, to enable sliding engagement of the frame assembly 22 with the base assembly 32. Two grip recesses 58 are positioned on the back plate 24 towards the outer perimeter of the frame assembly 22. The oblong grip recesses provide convenient hand holds for the frame assembly 22 to allow lifting and carrying of the electronic device 21 within the frame assembly 22, as shown in FIG. 2. The side members 44 of the frame 26 and the exterior perimeter of the back plate 24 define sides of the frame assembly 22 which extend frontwardly from the rear surface 56 of the back plate.

As shown in FIGS. 1 and 2, the base plate 38 of the base assembly 32 may be formed of stiff plastic such as ABS. The base plate 38 has a front surface 60 which is parallel to the rear surface 56 of the back plate 24 of the frame assembly 22. As shown in FIG. 3, the base plate 38 has an exterior perimeter 62 which is clear of sideward projections, which means that the base plate is able to accept a frame assembly which extends sidewardly in a cross direction C (which is perpendicular to the sliding direction S) an indeterminate amount beyond the base plate. The base assembly 32 is thus able to accept a wide variety of frame assemblies 22, including those that are wider or longer than the base assembly. It will be observed that the frame assembly sides extend frontwardly from the rear surface 56 of the back plate and do not engage the base assembly.

The two frontwardly projecting mounting blocks 36 may be integrally formed with the base plate 38, or, as shown in FIGS. 1 and 5, may be formed as a mounting block element 63 which has a block 36 protruding from a surrounding mounting block base 65. As shown in FIG. 1, the bases 65 of the mounting block elements 63 are received in recesses 64 which are machined into the base plate 38. Positioning pins 66 extend frontwardly within the mounting block recesses 64 which are received within pin holes 68 in the mounting block element bases 65. The mounting blocks 36 may be fastened within the recesses 64 by screw fasteners 70. The two mounting blocks 36 are aligned and are spaced from each in other in the direction of sliding S (shown in FIG. 3), defining an axis toward the pedestal-mounted male plug 40.

As shown in FIG. 2, the pedestal 25 is comprised of a pedestal cap 72 which overlies a pedestal mid-piece 74 which overlies a pedestal base 76 which is formed as a portion of the base plate 38. The pedestal cap, mid-piece and base 72, 74, 76 have aligned openings 78 which define a rearwardly extending cable conduit shown in FIG. 9, which receives the cable 23, shown in FIG. 2, which may be a conventional cable such as a USB Type-C (USB-C) cable having the male plug 40 on the end of the cable above the base plate 38 and a female port 86 on the end which is positioned beneath the base plate. The USB-C cable allows the transmission of both data and power. The pedestal 25, shown in FIG. 1, extends frontwardly from the base plate 38 and supports the male plug 40 of the cable 23, shown in FIG. 9, so that it projects parallel to the base plate and extending in the sliding direction S towards the mounting blocks 36, shown in FIG. 3. The male plug is spaced from the nearest mounting block 36 in the sliding direction S.

A cable cover 82, shown in FIGS. 1 and 9, is a plastic piece which is fastened to the rear of the base plate 38 with screw fasteners (not shown), and as shown in FIG. 1, has a cable cavity 84 which receives the cable 23, shown in FIG. 2, as it exits the pedestal cable conduit 80, shown in FIG. 9, and guides the cable to a position on the rear of the base plate 38 where the female port 86 is disposed for connecting to an exterior cable (not shown) communicating power and data with the electronic device. A cable tie slot 83, shown in FIGS. 1 and 3, is formed in the base plate 38 recessed from the front surface 60 to accommodate the thickness of a zip tie or other looped fastener (not shown). Two cable tie holes 85 are positioned within the cable tie slot 83 and extend through the base plate 38. The cable tie holes 85 allow the looped fastener to extend around an incoming cable (not shown) on the rear of the base plate 38 which engages with the female port 86 of the cable 23 which is supported by the cable cover 82.

As shown in FIG. 9, the pedestal cap 72 has a guide 88 which extends above the male plug 40 in the sliding direction towards the mounting blocks 36, shown in FIG. 1. As shown in FIG. 9, the horizontally projecting guide 88 is positioned to overlie a portion of the frame assembly 22 when it is received within the base assembly 32, and serves to protect the male plug 40 from a vertical encounter with the frame assembly. The guide 88 prevents the frame assembly 22 from being brought into engagement to the base assembly in a position that is too close to allow sliding engagement between the mounting slots 34 and the mounting blocks 36, as shown in FIG. 4.

As shown in FIG. 1, a latch 90 is provided between the base assembly 32 and the frame assembly 22. The latch 90 has a latch protrusion or nubbin 92 formed as an elastomeric part 94, shown in FIG. 2, which is mounted within a recess on the surface of a release tab 96 which is integrally formed with the base plate 38. As shown in FIG. 1, the release tab 96 extends in the sliding direction away from the mounting blocks 36, and may extend to about the position of the exterior of the pedestal 25. The release tab 96 is a linear member integrally formed with the base plate 38 at an inner end and separated from the base plate by a slot 98 extending in the sliding direction S. The release tab 96 has a sidewardly projecting part 100 providing a broad surface for engagement by a user. The release tab 96 has a reduced thickness segment 102 which is narrower than the thickness of the base plate 38 and which is positioned alongside the slot 98 and between the sidewardly projecting part 100 and the nubbin 92. The reduced thickness segment 102 is about half the thickness of the base plate 38. Thus for a base plate of about 9 mm thickness, the reduced thickness segment 102 is about 4-5 mm thick. The reduced thickness segment 102 allows deflection of the release tab 96 and thereby resiliently mounts the latch protrusion 92 with respect to the front surface 60 of the base plate 38. As shown in FIGS. 2 and 4, the latch 90 also includes a rearwardly opening latch recess 104 in the back plate 24 of the frame assembly 22 and positioned on the rear surface 56 of the back plate. The latch recess 104 is positioned to engage with the latch protrusion 92, shown in FIG. 1, such that sliding motion of the frame assembly in the sliding direction S, shown in FIG. 3, towards the pedestal to bring the frame assembly into engagement with the base assembly engages the latch protrusion within the latch recess to restrict motion of the frame assembly in the sliding direction away from the pedestal. As shown in FIG. 9, the latch protrusion 92 may have an inclined surface facing towards the mounting blocks, so that the rear surface 56 of the back plate 24, shown in FIG. 2, rides over and depresses the latch protrusion as the frame assembly 22 is slid into engagement with the base assembly 32, and then the protrusion is resiliently restored to a position within the latch recess 104, shown in FIG. 2, when the frame assembly is in its desired position with the male plug 40 on the pedestal engaged with the female port 42 of the electronic device 21 (shown in FIG. 1). The latch 90 restricts the escape of the frame assembly 22 from its desired mounted position with respect to the base assembly 32. When it is desired to remove the electronic device 21 within the frame assembly 22 from the base assembly, the user depresses the sidewardly projecting part 100 of the release tab 96, which thereby deflects the latch protrusion 92 rearwardly away from the latch recess 104 to release the frame assembly for movement in the sliding direction away from the pedestal 25. The latch 90 may be operated with a single hand, thereby allowing the frame assembly 22 to be held in one hand while the latch is released, so the framed electronic device 21 can be securely and conveniently removed from the base assembly 32.

As shown in FIGS. 4-9, the sliding connection between the frame assembly 22 and the base assembly 32 is controlled by the shapes of the mounting slots 34 and the mounting blocks 36 to guide the attachment of the frame assembly 22 to the base assembly 32. The objective of the connection process is that the female port 42 of the electronic device 21 (shown in FIG. 1) be brought into proper alignment with the male plug 40 of the cable supported on the pedestal 25. Although this positioning is necessarily precise, it is desirable that the connection process, often carried out within a vehicle under poor lighting, perhaps in motion, and with only one hand, be very error tolerant and secure. As shown in FIG. 4, the mounting slots 34 and blocks 36 cooperate in such a way as to accept significant mismatches in the initial positioning and direct the pieces to a snug and accurate final position.

As shown in FIGS. 5 and 6 each mounting block 36 has side ridges 106 which extend in the sliding direction S (shown in FIG. 3) and are shaped to be received within side groove lips 108 of a mating mounting slot 34. As shown in FIG. 6, the side groove lips 108 also extend in the sliding direction, and the two converging spaced side lips extend towards one another in the cross direction C perpendicular to the sliding direction S (shown in FIG. 3), thereby defining an engagement recess 110 frontward of the side lips and shown in FIGS. 4 and 6. The mounting block side ridges 106, shown in FIG. 5, extend outwardly in the cross direction to engage within the engagement recess when the frame assembly 22 is mounted to the base assembly 32 as shown in FIG. 3. It is this engagement which restricts motion of the frame assembly away from the base assembly in a frontward direction. As shown in FIG. 4, the mounting slot 34 has three segments which guide the assembly of the frame assembly 22 to the base assembly 32 from a rough alignment to a precise alignment. An entry segment 112 is the widest portion in the cross direction of the mounting slot having the most widely spaced side walls 113. A positioning segment 114 of the mounting slot extends from the entry segment, and in the positioning segment the width of the mounting slot is reduced by slot side walls 116 which converge in the cross direction, leading to an engagement segment 117 where the mounting block is snugly received in the mounting slot with the desired final position.

Thus the entry segment 112 communicates with the engagement segment 117 by the positioning segment 114. The positioning segment 114 has guide lips 118 which are positioned after the entry segment side walls 113 and continue to the side groove lips 108, the guide lips converge in the cross direction to engage the side ridges 106 of the mounting block 36 and bring them beneath the side groove lips 108 within the engagement recess 110. The three segments 112, 114, 116 are progressively narrower in the cross direction, such that the user can begin the connection of the parts with a rough positioning when the mounting blocks 36 are inserted into and received within the entry segments 112 of the mounting slots 34. By moving the frame assembly 22 in the sliding direction towards the pedestal 25, shown in FIG. 2, the mounting blocks 36 are brought into engagement with the guide lips 118 of the positioning segment which join the side groove lips 108 for aligning the mounting blocks within the engagement recess 110, as shown in FIG. 4.

As shown in FIG. 4, as a further aid to this engagement and positioning of the mounting block within the engagement segment 117 of the mounting slot, the mounting block side ridges 106 are spaced apart from one another a given amount in the cross direction along an engagement region 120 of the mounting bock, and the mounting block side ridges are less spaced apart in the cross direction along an entry portion 122 of the first mounting block. The entry portion 122 is positioned on an end of the mounting block 36 which faces away from the pedestal 25. The narrower entry portion 122 of the mounting block 36 with its sides that converge in the cross direction serves to direct the engagement of the mounting block with the mounting slot with a camlike action.

As shown in FIG. 3, the two mounting blocks 36 are positioned aligned in the sliding direction S, with the second mounting block positioned in the sliding direction away from the pedestal 25 and the other mounting block. The mounting slots 34 are spaced apart the same amount as the blocks are spaced in the sliding direction. In the connection of the frame assembly 22 to the base assembly 32, the rear surface 56 of the frame assembly back plate 24, shown in FIG. 2, is brought generally parallel to the front surface 60 of the base plate 38 of the base assembly, shown in FIG. 1. The pedestal cap guide 88 prevents the mounting blocks from entering the engagement segments 117 of the slots (shown in FIG. 4) directly frontwardly, and requires that the mounting blocks enter the mounting slots within the entry segments, thereby preparing the mounting blocks for sliding engagement with the mounting slots. To the extent that the blocks are not aligned in the cross direction, the converging portions of the slots and the blocks bring about proper alignment as the frame assembly is slid towards the pedestal 25, shown in FIG. 1. As shown in FIG. 4, when the end walls 124 of the mounting blocks abut the end walls 126 of the mounting slots, the frame assembly is fully positioned with respect to the base assembly, and the electronic device 21 female port 42 (shown in FIG. 1) is engaged with the male plug 40 and further travel in the sliding direction is prevented. Also, in this position, the protrusion of the latch nubbin 92 is received within the latch recess 104 (shown in FIG. 4) on the rear surface 56 of the frame assembly back plate 24. The framed electronic device 21 (shown in FIG. 1) may now be operated until such time as it is desired to remove it.

When a user wishes to remove the frame assembly 22 from the base assembly 32, the release tab 96 is depressed rearwardly, and the user slides the frame assembly away from the pedestal 25. To facilitate the separation of the frame assembly from the base assembly, the mounting blocks 36 each have a base camming out surface 128, shown in FIG. 8, which faces the pedestal 25 (shown in FIG. 1) and is inclined towards the base plate 38, and the mounting slots 34 (shown in FIG. 4) each have a frame caroming out surface 130 which faces away from the pedestal and which is inclined towards the base plate (when the frame assembly is mounted to the base assembly). When the user slides the frame assembly 22 in the sliding direction S away from the pedestal 25, shown in FIG. 3, the frame caroming out surfaces 130, shown in FIG. 4, engage the base camming out surfaces 128, shown in FIG. 8, to direct the frame assembly in a frontward direction with respect to the base assembly to facilitate separation.

The base assembly 32 may be fixed in place at a workstation or within a vehicle, for example as shown in FIG. 1 with a conventional swivel mount 148 fixed to the rear of the base plate 38.

Since the base assembly does not require any sideward structure to engage or guide the frame assembly, the base assembly can readily accept framed electronic devices of a wide variety of dimensions. So long as the mounting slots on the frame assembly match the mounting blocks, the frame assembly may be narrower or longer than the base plate, meaning that the same installed mounting assembly can accommodate an upgraded or substituted electronic device, reducing replacement costs.

The mounting assembly 20 is very robust, because the main moving part is the frame assembly itself, and the other moving part, the latch, relies on the resilient properties of an integral plastic part, being very durable. The frame assembly is first connected to base assembly by the mounting block and mounting slot engagement, and only after this engagement is the frame assembly slid to engage the female port of the electronic device with the male plug on the pedestal. Thus the mounting plug sees only on-axis forces, reducing any forces that would twist, bend, or distort the plug.

Figure 10:
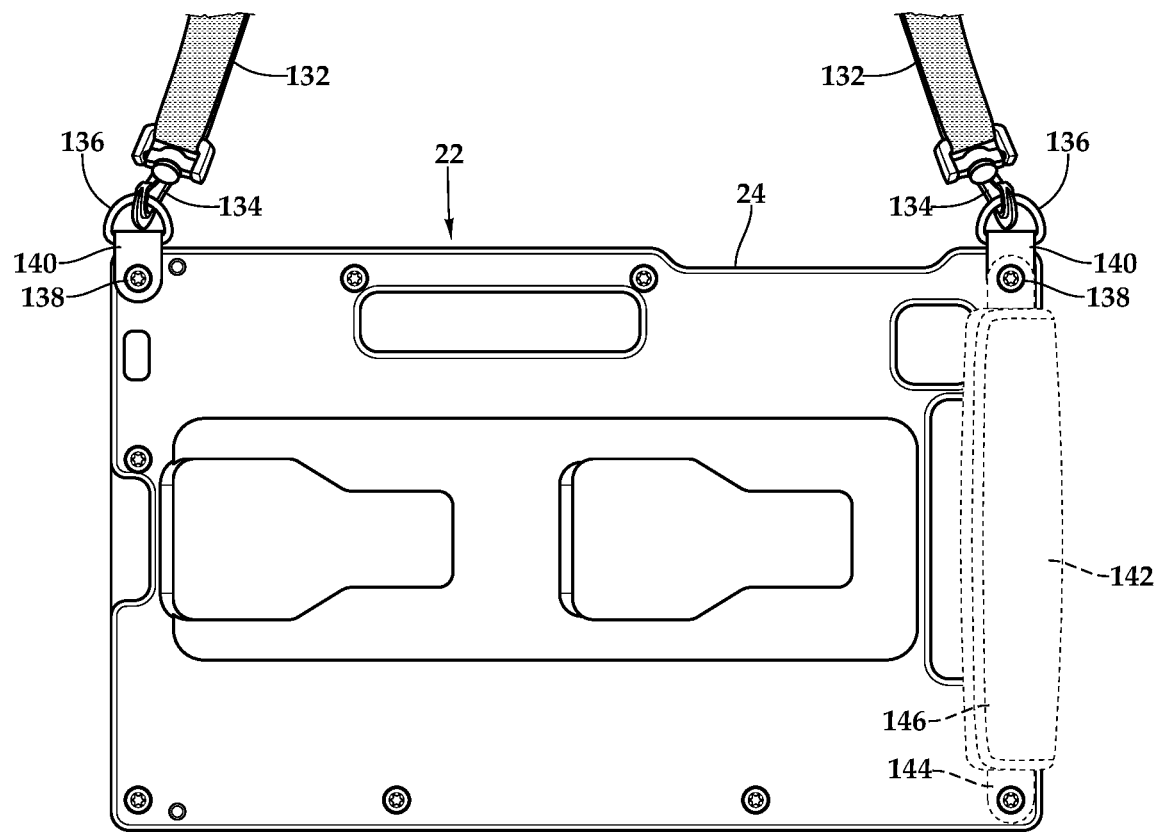
FIG. 10 is a bottom plan view of the frame assembly of FIG. 1 with a shoulder strap attachment and an alternative hand strap attachment shown in phantom lines.

As shown in FIG. 10, the frame assembly 22 may be provided with a shoulder strap 132 which is connected with swivel hooks 134 which engage two D-rings 136 which are fastened by screw fasteners 138 holding looped straps 140 to the back plate 24 of the frame assembly 22. Alternatively, the frame assembly may be provided with a hand hold 142 having an internal strap 144 which is secured at each end by a screw fastener 138 and a textured grip 146 encircling the internal strap 144, and being attachable, for example, by hook and loop fasteners. The user may then grip the hand hold 142 or shoulder strap 132 to grasp and transport the frame assembly 22 and electronic device 21 (shown in FIG. 1) while away from the base assembly 32.

It should be noted that although the mounting slots are shown positioned on the frame assembly and the mounting blocks positioned on the base assembly, the positioning may be reversed.

Figure 11:
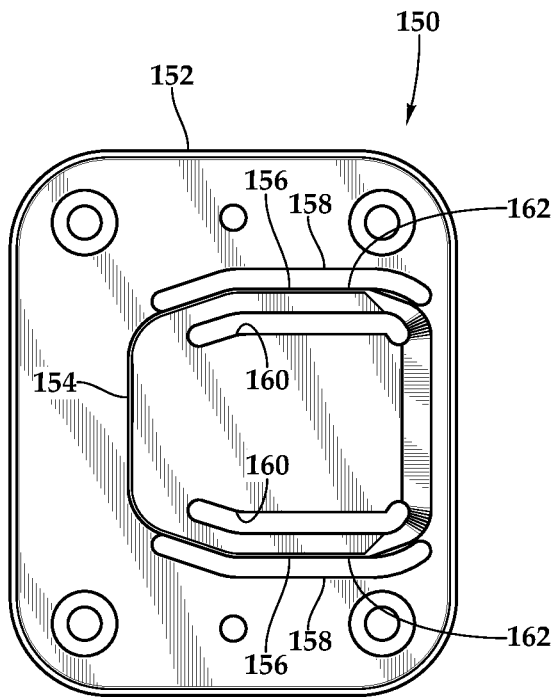
FIG. 11 is a front elevational view of an alternative embodiment mounting block element having spring members for use with the device of FIG. 1.

An alternative mounting block element 150 for use in the base assembly of this invention is shown in FIG. 11. The mounting block element 150 is a unitary plastic part which has a block base plate 152 of a shape to be received within the mounting block recess 64 of the base assembly base plate 38 and held there by fasteners 70, as shown with the part 63 in FIG. 1. The mounting block element has a mounting block 154 which projects frontwardly from the block base plate 152. Two deflectable spring members 156 are spaced in the cross direction on opposite sides of the mounting block 154. Each spring member 156 is defined between a plate slot 158 on the outside of the mounting block, and a block slot 160 located on the interior of the mounting block. The plate slots 158 extend through the entire thickness of the block plate 152 and the block slots 160 extend through the entire thickness of the mounting block and block plate. The spring members 156 are thus defined between an inner block slot 160 and an outer plate slot 158 and are deflectable in response to forces applied in the cross direction. Each spring member 156 has a side ridge 162 extending in the cross direction similar to the side ridges 106 discussed above. The spring members 156 thus deflect inwardly when the mounting block is engaged with a mounting slot, contributing to a snug connection between the parts.

Figure 12:
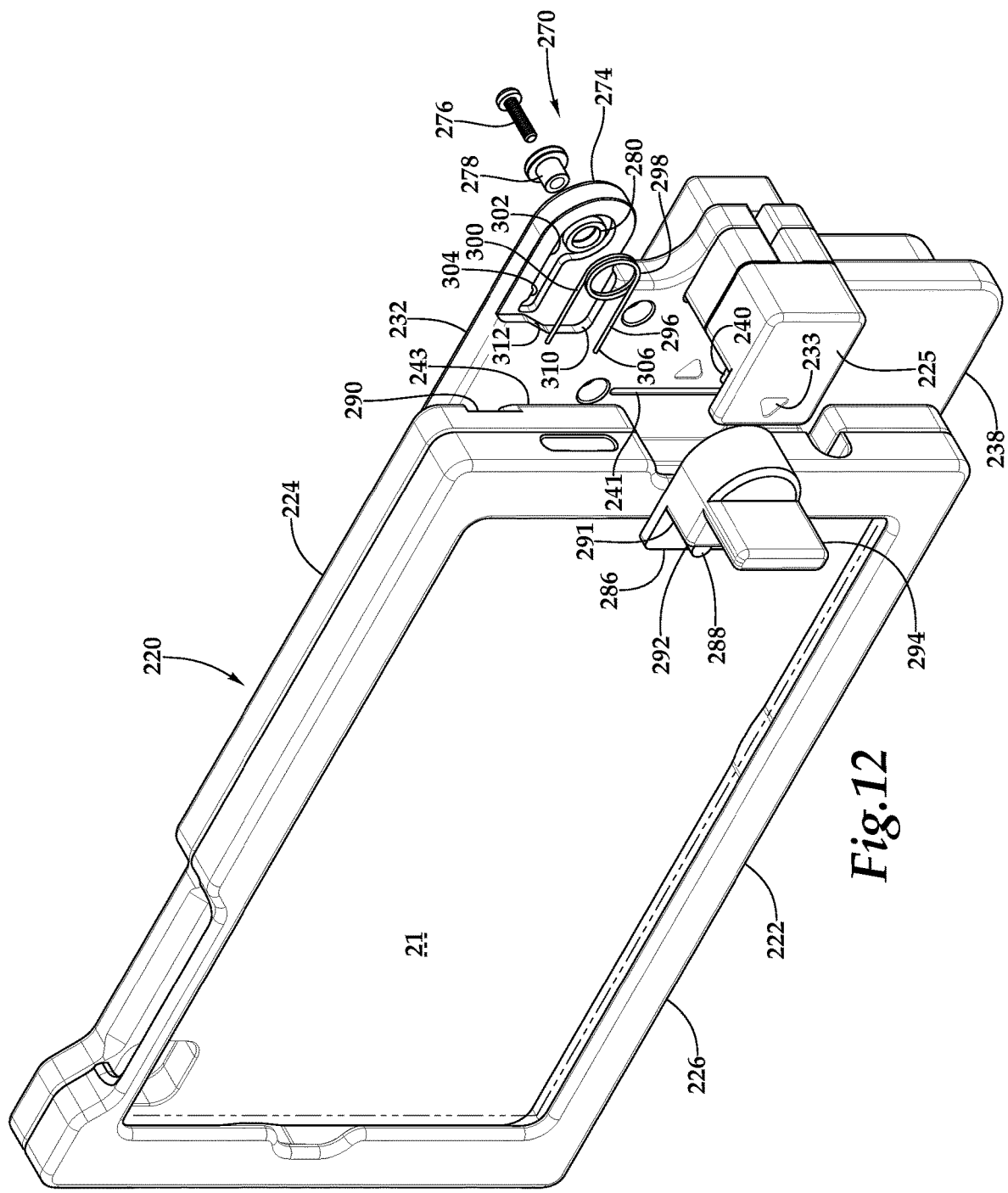
FIG. 12 is a front exploded isometric view of an alternative embodiment quick disconnect electronic device mount of this invention have a knob release latch.

An alternative embodiment mounting assembly 220 is shown in FIGS. 12-26. The assembly 220 has a frame assembly 222 which is slidably received on a base assembly 232. The frame assembly 222 has mounting slots similar to the mounting slots 34 of the assembly 20, and the base assembly 232 has mounting blocks similar to the mounting blocks 36 of the assembly 20 (shown in FIG. 1) or the mounting blocks 150 (shown in FIG. 11). As shown in FIG. 12, a pedestal 225 projects frontwardly from the base assembly 232 and is provided with indicia 233 such as a recessed triangle indicating the point of connection between the male plug 240 of the base assembly and the female port 42 of the electronic device 21 (device port shown in FIG. 1). As shown in FIG. 12, the frame assembly 222 has a frame 226 secured by screw fasteners to a back plate 224. As in the assembly 20, the frame assembly 222 retains and protects the electronic device 21 and presents the device's female port for connection to the male plug 240. The base assembly base plate 238 has indicia 241 such as a recessed line which indicates where the leading end wall 243 of the back plate 224 should be positioned in order to begin the sliding engagement between the frame assembly and the base assembly.

A latch assembly 270 has a latch member or knob 272 which is rotatably mounted to a sidewardly protruding tab 274 which extends from the base plate 238. The knob 272 is mounted by a threaded screw fastener 276 which extends through a flanged plastic bushing 278 positioned in a mounting hole 280 in the mounting tab 274 and is threaded into a threaded opening 282 in the knob 272 shown in FIG. 25. As shown in FIG. 12, the knob 272 is thus mounted to the base assembly 232 and operable to engage the frame assembly 222 when the frame assembly is slid along the base assembly to mate the female connector or port 42 of the electronic device 21 with the male plug 240 of the base assembly, and to latch the frame assembly to the base assembly in a latched configuration. The latch assembly is further operable to unlatch the frame assembly from the base assembly and urge the electronic device female connector out of its latched connection to the male plug.

Figure 25:
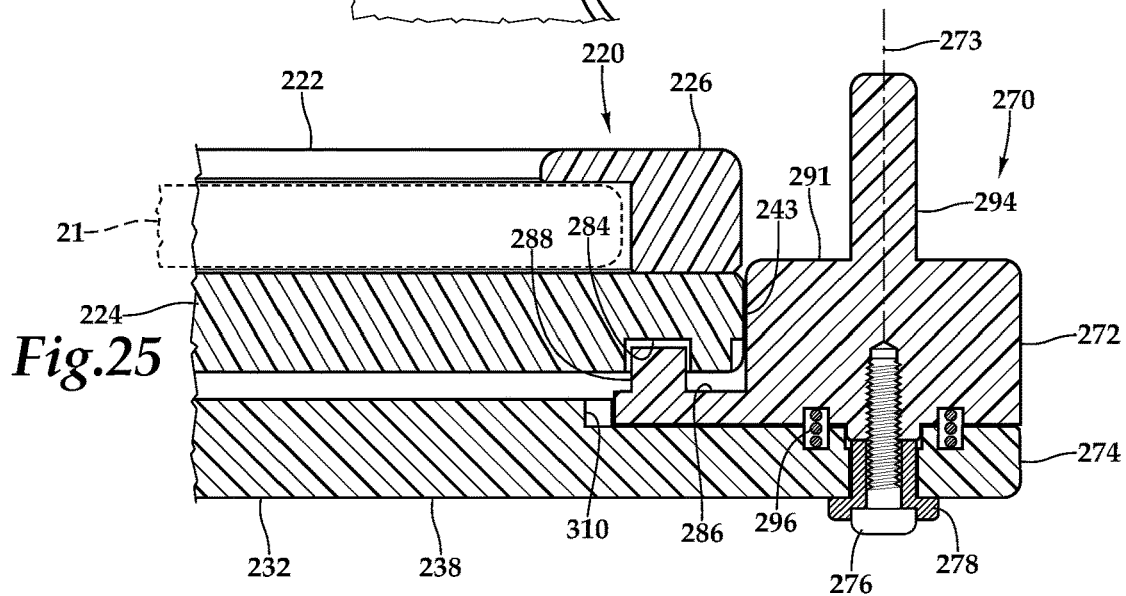
FIG. 25 is a fragmentary cross-sectional view of the device of FIG. 24 taken along section line 25-25, showing the fully latched position.
Figure 26:
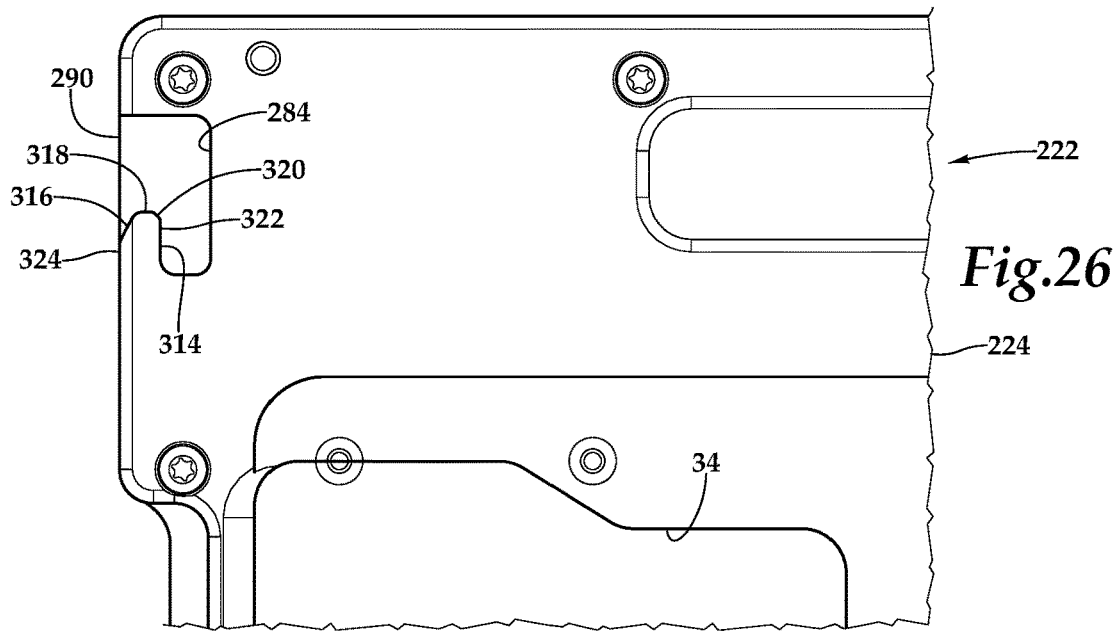
FIG. 26 is a rear plan view of the frame assembly of the device of FIG. 12.

As shown in FIGS. 25, the back plate 224 of the frame assembly has a rearwardly facing latch slot 284. As shown in FIG. 26, the latch slot 284 has a mouth 290 which opens towards the knob 272, shown in FIG. 25, along the leading end wall 243 of the back plate 224.

Figure 24:
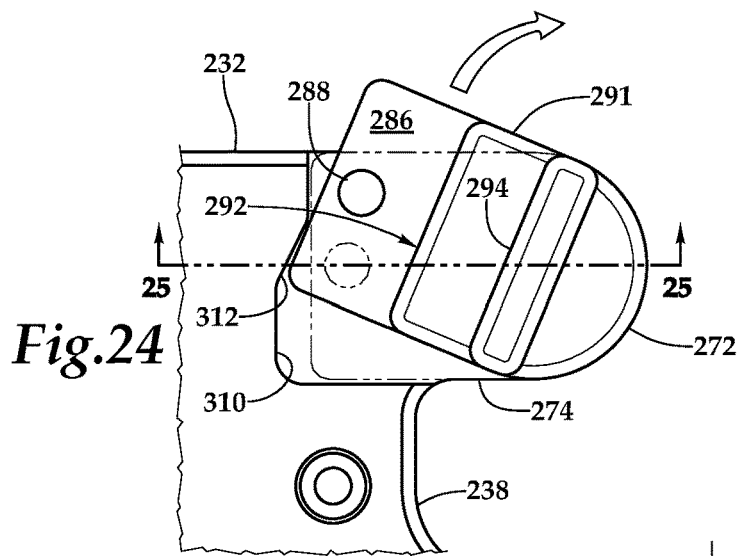
FIG. 24 is a fragmentary plan view of the device of FIG. 12, showing the knob in the full release position, and the knob shown in phantom line in a fully latched position.

The knob 272 is rotatably mounted to the base assembly to rotate about an axis 273 extending in the vertical direction. As shown in FIG. 24, the knob 272 has a sidewardly protruding shelf 286 which projects from the knob to extend between the frame assembly 222 and the base assembly 232 when the frame assembly is slidably engaged with the base assembly. The knob shelf 286 has a cylindrical post 288 which extends frontwardly from the shelf 286 for entrance into the mouth 290 of the latch slot 284 as shown in FIG. 25. As shown in FIGS. 24, the knob 272 has a frontwardly projecting ejector member 291 with an ejector wall 292 which faces the back plate leading end wall 243, as shown in FIG. 25. A handle 294 projects frontwardly from the knob 272 for engagement by a user to facilitate rotation of the knob.

Figure 13:
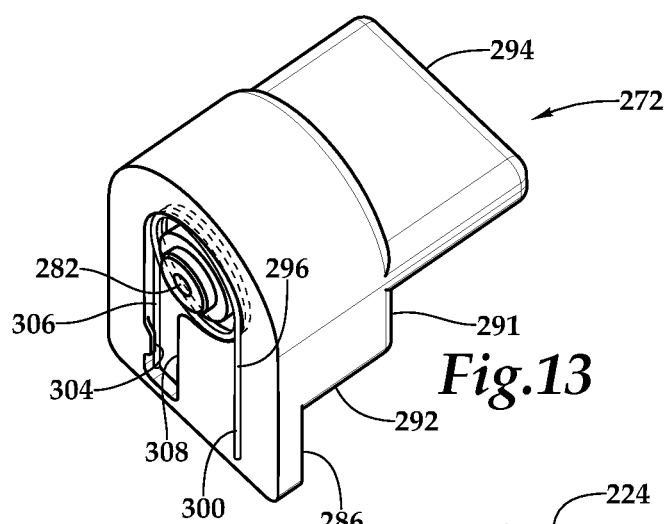
FIG. 13 is a rear isometric view of the knob and spring of the latch of the device of FIG. 12

As shown in FIGS. 12 and 13 a torsion spring 296 is positioned between the knob 272 and the base assembly 232. As shown in FIG. 12, the spring 296 has a coil 298 with a first leg 300 which is received within a spring recess 302 on the base mounting tab 274 and a second leg 306 which is received within a spring recess 308 on the underside of the knob 272, as shown in FIG. 13. Each leg 300, 306 is retained within its associated spring recess 302, 308 by a narrow undercut flange 304. As shown in FIGS. 12 and 24, the knob is thus retained for rotation within a knob depression 310 formed in the base mounting tab 274. The knob depression 310 is configured to allow free rotation of the knob and the projecting shelf 286. As shown in FIG. 24, the knob depression has a limit wall 312 at its perimeter which limits the extent of knob rotation. The spring 296 urges the knob 272 into a position which latches the frame assembly to the base assembly.

Figure 14:
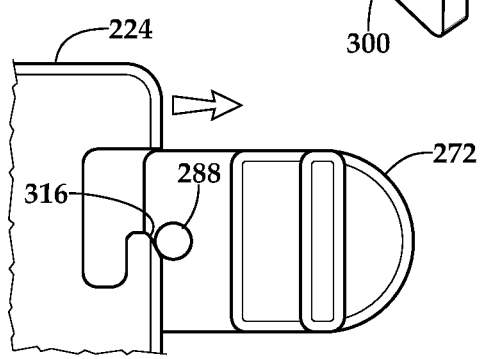
FIGS. 14-19 are schematic views showing the operation of the latch of the device of FIG. 12 as the frame assembly is secured to the base assembly.
Figure 17:
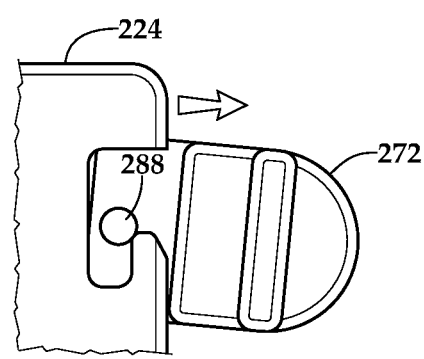
Figure 15:
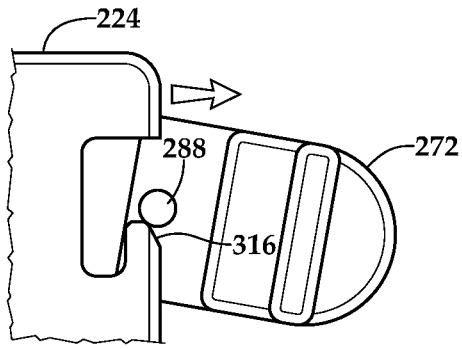
Figure 16:
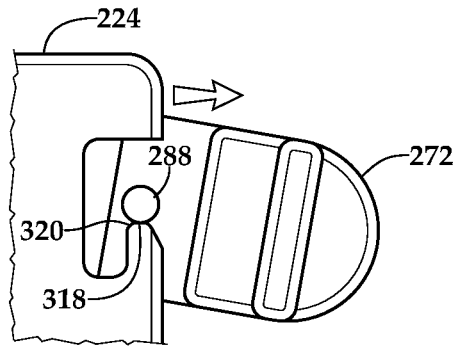

As shown in FIG. 26, the latch slot 284 has a perimeter 314 which includes wall segments which interact with the knob post 288, shown in FIG. 25, to latch the frame assembly 222 to the base assembly 232 as the frame assembly is slid into the latched position, and to eject the frame assembly when the knob 272 is rotated. The latch slot 284 opens towards the post 288. As shown in FIG. 26, the interior perimeter 314 of the slot has a first segment 316 at the mouth 290 which functions as an inlet ramp to the latch slot. The direction of sliding motion of the frame assembly with respect to the base assembly is a first direction, and a cross direction is defined perpendicular to the first direction. The inlet ramp first segment 316 of the latch slot perimeter 314 extends in both the first direction and the second direction. The schematic views of FIGS. 14-23 show the relationship between the knob 272 and the latch slot 284 as the frame assembly is latched to the base assembly (FIGS. 14-19) and as it is ejected therefrom (FIGS. 20-23). Note that the device is shown schematically in FIGS. 14-29 and for clarity not all parts are illustrated. For the following discussion the movement of the parts is illustrated in the schematic figures, but attention is directed to FIGS. 25 and 26 for the structural details. As shown in FIG. 14, as the frame assembly with its back plate 224 is slid along the base assembly 232 its motion is constrained by the engagement of the mounting blocks and mounting slots to move exclusively in the first direction. When the leading end wall 243 of the back plate 224 of the frame assembly back plate 224 engages the post 288, it is the first segment 316 of the latch slot perimeter which makes initial contact. The inclined first segment 316 forces the knob to pivot as shown in FIG. 15 and the post 288 travels along the first segment to a second segment 318 of the latch slot perimeter wall, as shown in FIG. 16. The second segment 318 extends in the first direction and joins a third segment 320 which is an inclined segment extending in the first direction and the cross direction. As the frame assembly 222 continues its progress in the first direction, as shown in FIG. 17, the post 288 continues to be engaged with the latch slot perimeter 314 under the urging of the spring 296.

Figure 18:
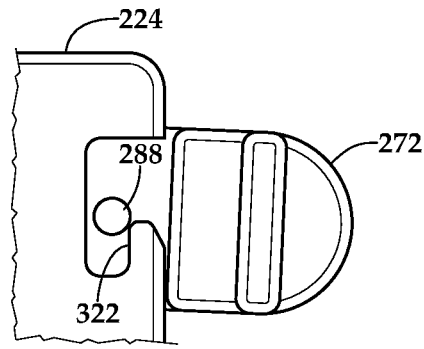
Figure 19:
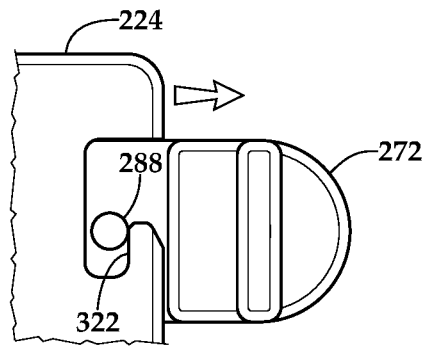

The third segment 320 of the perimeter wall is continuous with a fourth segment 322 of the latch slot perimeter 314 which extends strictly in the cross direction. Once the post 288 clears the third segment 320 as shown in FIGS. 18-19, the spring 296 restores the knob 272 to its initial position and the post rapidly moves to its latched configuration. This rapid movement to the terminal position of the knob produces a sensible noise or click which confirms to the operator of the device that the frame assembly 222 is now securely latched to the base assembly 232 and the male plug 240 of the base assembly is properly inserted within the female connector of the electronic device. An intervening finger 324 of the back plate 224 is defined between the first inlet ramp segment 318 and the fourth retention segment 322 and this finger is positioned between the post 288 and the ejector wall 292 of the knob 272. The finger 324 prevents the escape of the post 288 and hence removal of the frame assembly from the base assembly, so long as the knob is in its unrotated condition.

Figure 20:
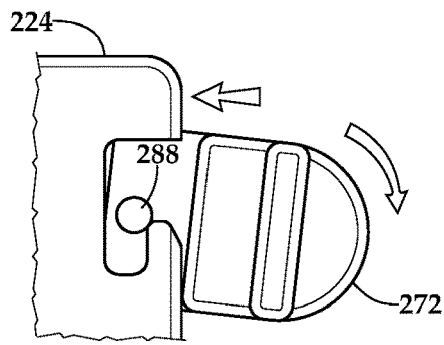
FIGS. 20-23 are schematic views showing the operation of the latch of the device of FIG. 12 as the frame assembly is released from the base assembly.
Figure 21:
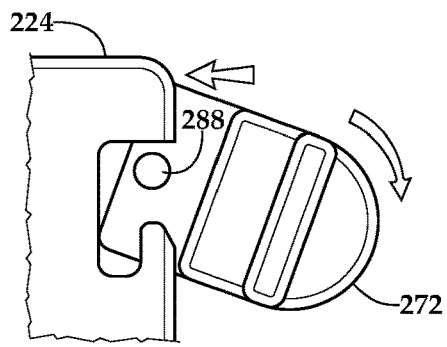
Figure 22:
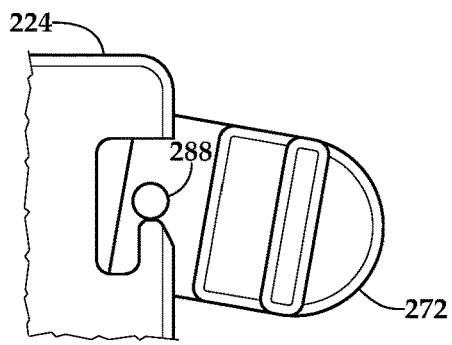
Figure 23:
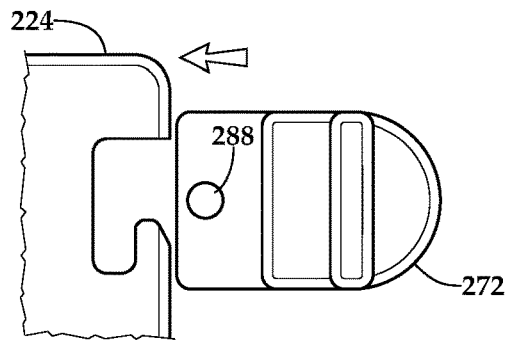

When a user desires to remove the frame assembly 222 and the electronic device from the base assembly, the handle 294 of the knob 272 is engaged and rotated as shown in FIGS. 20-23 to not only release the latch but to partially eject the frame assembly. As shown in FIG. 20, the rotation of the knob 272 brings the post 288 along the fourth wall segment 322 to engage the third inside ramp segment 320. In this position, the rotated ejector wall 292 of the ejector member 291 of the knob 272 engages the leading end wall 243 of the back plate 224 and urges the frame assembly 222 in the first direction out away from the pedestal 225. Continued rotation of the knob 272 moves the post 288 out of contact with the latch slot perimeter wall 314 as shown in FIG. 21, and continued engagement of the ejector wall 292 moves the frame assembly 222 further away from the pedestal in the first direction, until the shelf 286 of the knob engages the limit wall of the knob depression 310 as shown in FIG. 24. If the user releases the knob 272 when the frame assembly is in this position, the spring 296 will urge the post 288 into engagement with the latch slot perimeter wall, as shown in FIG. 22, but, because of the partially ejected configuration, the post will engage the second rest segment 318 of the perimeter wall, and the frame assembly will not be latched. The frame assembly 222 is thus now in a fully unlatched configuration, but is still fully retained on the base assembly 232. This arrangement facilitates an effective separation of the frame assembly from the base assembly using only a single hand at a time. With one hand the user rotates the knob 272 to unlatch the frame assembly, and then the user may with one hand immediately, or after a delay, grip the frame assembly and continue the progress of the frame assembly in the first direction away from the pedestal until the mounting slots are out of engagement with the mounting blocks and the frame assembly can be fully removed from the base assembly.

It is understood that the invention is not limited to the particular construction and arrangement of parts herein illustrated and described, but embraces all such modified forms thereof as come within the scope of the following claims.

I claim:

1. A mounting assembly for an electronic device comprising:
   a base assembly having a base plate and having a pedestal which projects from the base plate and which supports a male plug projecting parallel to the base plate;
   a frame assembly configured to retain an electronic device therein while exposing a female connector of the electronic device for access, the frame assembly having a back plate which is positioned to overlie the base plate, the direction between the base plate and the back plate defining a vertical direction;
   a first mounting block having portions projecting in the vertical direction into a first mounting slot, wherein the first mounting block is fixed to one of the base plate and the back plate, and the first mounting slot is positioned on the other of the base plate and the back plate to form a first sliding connection between the base assembly and the frame assembly, and wherein the male plug is spaced from the first sliding connection in a first direction which is perpendicular to the vertical direction, and wherein the first mounting slot initially engages the first mounting block at a first position where the male plug does not engage the exposed female connector; and
   wherein the first mounting slot is positioned for sliding engagement with the first mounting block in the first direction, such that sliding movement of the frame assembly with respect to the base assembly in the first direction towards the pedestal engages the frame assembly with the base assembly in alignment with the male plug of the pedestal to thereby mate the female connector of the electronic device with the male plug of the base assembly; and
   wherein the pedestal projects from the base plate at a first end of the base assembly, and wherein a rotatable latch member is mounted to the base assembly at the first end and is arranged to rotate about an axis extending in the vertical direction, the rotatable latch member being and operable to engage the frame assembly when the frame assembly is slid along the base assembly to mate the female connector of the electronic device with the male plug of the base assembly, and to latch the frame assembly to the base assembly in a latched configuration and further operable to unlatch the frame assembly from the base assembly by rotation thereof to thereby urge the electronic device female connector out of its latched connection to the male plug.

2. The frame assembly of claim 1 wherein the first mounting slot has an entry segment which communicates with an engagement segment, wherein the entry segment is closer to the pedestal than the communicating engagement segment, and wherein a cross direction is defined perpendicular to the first direction, and wherein the entry segment has a width in the cross direction, and the engagement segment has a width in the cross direction which is less than the entry segment width, wherein the engagement segment has projecting side lips with recesses frontward of the side lips, such that the first mounting slot is configured to receive the first mounting block on the base assembly within the entry segment for sliding engagement into the engagement segment.

3. A mounting assembly for an electronic device comprising:
   a base assembly having a base plate and having a male plug projecting from a pedestal parallel to the base plate;
   a frame assembly configured to retain an electronic device therein while exposing a female connector of the electronic device for access, the frame assembly having a back plate which is positioned to overlie the base plate, the direction between the base plate and the back plate defining a vertical direction;
   a first mounting block having portions projecting in the vertical direction into a first mounting slot, wherein the first mounting block is fixed to one of the base plate and the back plate, and the first mounting slot is positioned on the other of the base plate and the back plate to form a first sliding connection between the base assembly and the frame assembly, and wherein the male plug is spaced from the first sliding connection in a first direction which is perpendicular to the vertical direction, and wherein the first mounting slot initially engages the first mounting block at a first position where the male plug does not engage the exposed female connector; and wherein the first mounting slot is positioned for sliding engagement with the first mounting block in the first direction, such that sliding movement of the frame assembly with respect to the base assembly in the first direction towards the pedestal engages the frame assembly with the base assembly in alignment with the male plug of the pedestal to thereby mate the female connector of the electronic device with the male plug of the base assembly; and a latch member mounted to the base assembly and operable to engage the frame assembly when the frame assembly is slid along the base assembly to mate the female connector of the electronic device with the male plug of the base assembly, and to latch the frame assembly to the base assembly in a latched configuration and further operable to unlatch the frame assembly from the base assembly and urge the electronic device female connector out of its latched connection to the male plug;

wherein the back plate of the frame assembly has portions defining a rearwardly facing latch slot, and wherein the latch member comprises a knob rotatably mounted to the base assembly to rotate about an axis extending in the vertical direction, the knob having a shelf which projects from the knob to extend between the frame assembly and the base assembly when the frame assembly is slidably engaged with the base assembly, wherein a post extends frontwardly from the shelf for engagement with a mouth of the latch slot.

4. The mounting assembly of claim 3 wherein the back plate has a leading end wall which faces the knob, and wherein the mouth of the latch slot opens on the leading end wall, and wherein the knob has a frontwardly projecting ejector wall which faces the back plate leading end wall, and wherein the knob is positioned on the base assembly such that rotation of the knob in the latched configuration releases the post from within the latch slot and urges the ejector wall against the back plate leading end wall to urge the frame assembly in a direction parallel to the first direction towards the first position.

5. The mounting assembly of claim 4 further comprising a handle which projects frontwardly from the knob for engagement by a user to facilitate rotation of the knob.

6. The mounting assembly of claim 3 further comprising a spring positioned between the knob and the base assembly such that the spring urges the knob into a position which latches the frame assembly to the base assembly.

7. The mounting assembly of claim 3 wherein the mouth of the latch slot opens towards the knob, and wherein the latch slot is positioned to receive therein the latch knob post, the latch slot having an interior perimeter having a first segment at the mouth which extends in the first direction and a cross direction which is perpendicular to the first direction;

wherein the latch slot perimeter has a retention wall segment which is spaced in the first direction from the first segment, such that the when the frame assembly is slid in the first direction in engagement with the base assembly, the latch knob post enters the mouth of the latch slot and travels in the cross direction along the first segment, and passes into the latch slot and is retained against the retention wall in a position spaced from the first segment.

8. The frame assembly of claim 7 wherein the back plate has portions which define:
  a second segment of the latch slot perimeter which extends from the first segment in the first direction; and
  a third segment extending in the first direction and the cross direction and connecting the second segment to the retention wall.

9. A mounting assembly for an electronic device comprising:
  a base assembly having a base plate;
  a male plug projecting parallel to the base plate;
  a frame assembly configured to retain an electronic device therein while exposing a female connector of the electronic device for access, the frame assembly having a back plate which is positioned to overlie the base plate, the direction between the base plate and the back plate defining a vertical direction, wherein portions of the frame assembly engage with portions of the base plate to restrict the motion of the frame assembly in slidable engagement with the base assembly for motion in a first direction towards the male plug;
  wherein the back plate of the frame assembly has a latch slot which faces the base plate;
  a knob rotatably mounted to the base plate about a rotation axis extending in the vertical direction, and rotatable between a latched position and an unlatched position, the knob having a shelf which extends from an ejector member;
  a post which extends upwardly from the shelf of the knob in the vertical direction, wherein the latch slot opens at a mouth towards the post in the first direction and is positioned to engage the post as the frame assembly is slid in the first direction along the base assembly;
  a spring disposed between the knob and the base plate and acting to urge the knob into the latched position in which the post is received within the latch slot; and
  wherein sliding movement of the frame assembly with respect to the base assembly in the first direction towards the male plug engages the frame assembly with the base assembly in alignment with the male plug to thereby mate the female connector of the electronic device with the male plug of the base assembly, and rotate the knob to cause the post on the shelf of the knob to enter the latch slot and thereby latch the frame assembly to the base assembly.

10. The mounting assembly of claim 9 wherein the shelf projects from the knob to extend between the frame assembly and the base assembly when the frame assembly is slidably engaged with the base assembly.

11. The mounting assembly of claim 10 wherein the back plate has a leading end wall which faces the knob, and wherein the mouth of the latch slot opens on the leading end wall, and wherein the knob ejector member has a frontwardly projecting ejector wall which faces the back plate leading end wall and which is spaced in the first direction from the post, and wherein the knob is positioned on the base assembly such that rotation of the knob in a latched configuration releases the post from within the latch slot and urges the ejector wall against the back plate leading end wall to urge the frame assembly in a direction parallel to the first direction away from the male plug.

12. The mounting assembly of claim 11 further comprising a handle which projects frontwardly from the knob for engagement by a user to facilitate rotation of the knob.

13. The mounting assembly of claim 11 wherein the latch slot has an interior perimeter having a first segment at the mouth which extends in the first direction and wherein a cross direction is defined perpendicular to the first direction, the first segment positioned to engage the post when the frame assembly is urged towards the knob in the first direction, and further comprising:

wherein the latch slot perimeter has a retention wall segment which is spaced in the first direction from the first segment, such that when the frame assembly is slid in the first direction in engagement with the base assembly, the latch knob post enters the mouth of the latch slot and travels in the cross direction along the first segment, and passes into the latch slot and is retained by the retention wall in a position spaced from the first segment.

14. The frame assembly of claim 13 wherein the back plate has portions which define:

a second segment of the latch slot perimeter which extends from the first segment in the first direction; and a third segment extending in the first direction and the cross direction and connecting the second segment to the retention wall.

15. The frame assembly of claim 9 wherein the portions of the frame assembly which engage with the portions of the base plate to restrict the motion of the frame assembly in slidable engagement with the base assembly for motion in a first direction towards the male plug comprise a first mounting slot and a mounting block, and wherein the first mounting slot has an entry segment which communicates with an engagement segment, wherein the entry segment is closer to the male plug than the communicating engagement segment, and wherein a cross direction is defined perpendicular to the first direction, and wherein the entry segment has a width in the cross direction, and the engagement segment has a width in the cross direction which is less than the entry segment width, wherein the engagement segment has projecting side lips with recesses frontward of the side lips, such that the first mounting slot is configured to receive the mounting block on the base assembly within the entry segment for sliding engagement into the engagement segment.

16. A frame assembly for an electronic device configured for sliding engagement in a first direction to a base assembly having a projecting first mounting block and a rotatable latch knob with a frontwardly projecting post, the frame assembly comprising:

a frame having a front opening configured to provide access to a display screen of an electronic device;

a back plate releasably fastened to the frame for receiving an electronic device between the frame and the back plate, wherein the frame and the back plate define an access opening configured to expose a female connector of the electronic device contained therein for access, wherein the access opening is located at a connection end of the frame assembly;

wherein the back plate has a rearwardly facing rear surface, and wherein portions of the back plate define a rearwardly facing first mounting slot recessed from the rear surface, and wherein the first direction is defined between the first mounting slot and the connection end, the first mounting slot positioned for sliding engagement with the first mounting block of the base assembly and motion in the first direction;

wherein the first mounting slot is configured to receive the first mounting block on the base assembly for sliding engagement therewith in the first direction;

wherein the back plate has a latch slot which faces rearwardly and which has a mouth which opens on the connection end of the frame assembly, the latch slot positioned to receive therein a latch knob post extending from the base assembly rotatable latch knob, the latch slot having an interior perimeter having a first segment at the mouth which extends in the first direction and wherein a cross direction is defined perpendicular to the first direction; and wherein the interior perimeter of the latch slot has a retention wall segment which is spaced in the first direction from the first segment, such that when the frame assembly is slid in the first direction in engagement with the base assembly, the latch knob post enters the mouth of the latch slot and travels in the cross direction along the first segment, and passes into the latch slot and is retained against the retention wall in a position spaced from the first segment.

17. The frame assembly of claim 16 wherein the back plate has portions which define:

a second segment of the latch slot perimeter which extends from the first segment in the first direction; and a third segment extending in the first direction and the cross direction and connecting the second segment to the retention wall.

18. The frame assembly of claim 16 wherein the first mounting slot has an entry segment which communicates with an engagement segment, wherein the entry segment is closer to the connection end than the communicating engagement segment, and wherein the entry segment has a width in the cross direction, and the engagement segment has a width in the cross direction which is less than the entry segment width, wherein the engagement segment has projecting side lips with recesses frontward of the side lips, such that the first mounting slot is configured to receive the mounting block on the base assembly within the entry segment for sliding engagement into the engagement segment.

* * * * *

UNITED STATES PATENT AND TRADEMARK OFFICE
CERTIFICATE OF CORRECTION

PATENT NO. : 11,815,224 B1
APPLICATION NO. : 18/203144
DATED : November 14, 2023
INVENTOR(S) : Stig Göran Anders André

It is certified that error appears in the above-identified patent and that said Letters Patent is hereby corrected as shown below:

In the Specification
Column 3, Line 42, "with the male plug of the cable" should be --with the male plug 40 of the cable--.
Column 4, Line 57, "extending cable conduit shown" should be --extending cable conduit 80, shown--.
Column 5, Line 1, "The male plug is spaced" should be --The male plug 40 is spaced--.
Column 8, Line 3, "frame caroming out" should be --frame camming out--.
Column 8, Line 8, "frame caroming out" should be --frame camming out--.

In the Claims
Claim 1, Column 12, Line 24, "latch member being and" should be --latch member being--.

Signed and Sealed this
Thirtieth Day of January, 2024

Katherine Kelly Vidal
*Director of the United States Patent and Trademark Office*